No. 862,963.

PATENTED AUG. 13, 1907.

C. CRETORS.
VEHICLE.
APPLICATION FILED DEC. 27, 1906.

Attest:
John Enders
Henry Moe

Inventor:
Charles Cretors
by Robert Burns
Attorney

UNITED STATES PATENT OFFICE.

CHARLES CRETORS, OF CHICAGO, ILLINOIS.

VEHICLE.

No. 862,963.            Specification of Letters Patent.            Patented Aug. 13, 1907.

Application filed December 27, 1906. Serial No. 349,721.

*To all whom it may concern:*

Be it known that I, CHARLES CRETORS, a citizen of the United States of America, and a resident of Chicago, in the county of Cook and State of Illinois, have invented certain new and useful Improvements in Vehicles, of which the following is a specification.

This invention relates to that class of vehicles used in the retail vending of pop-corn, roasted peanuts and the like, and has for its object to provide a simple and efficient structural arrangement and combination of parts whereby a containing drawer for a reserve supply of the commodities, and of extended capacity, is provided beneath the rear end of the vehicle, all as will hereinafter more fully appear.

Figure 1:
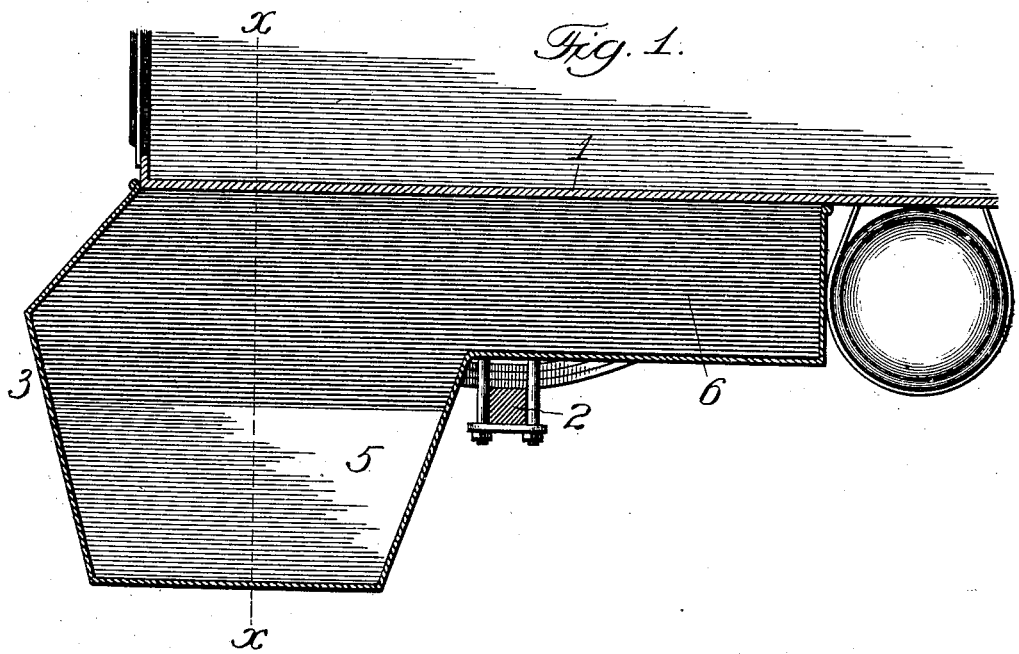
Figure 2:
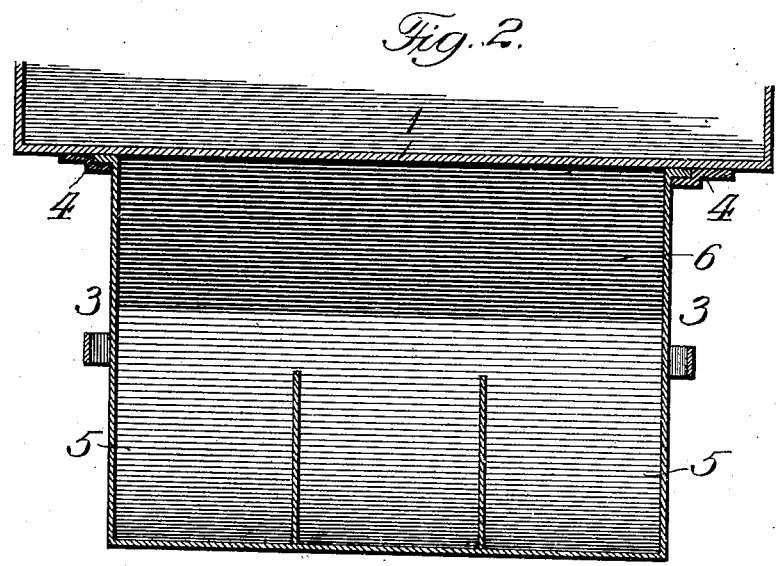

In the accompanying drawings:—Figure 1, is a detail longitudinal section of the lower rear portion of a vehicle with the present invention applied. Fig. 2, is a detail transverse section on line $x$—$x$ Fig. 1, illustrating the sliding connection of the drawer to the bottom of the vehicle.

Similar numerals of reference indicate like parts in both views.

Referring to the drawing, 1 represents the floor or bottom of the vehicle, and 2 the rear axle by which the rear end of the vehicle body is supported.

3, is a drawer sliding in guide tracks 4, on the underside of the vehicle floor or body as shown. In the present improvement such drawer is formed with a deep portion 5, at its rear end and with a shallow portion 6 at its forward end, as shown, and the arrangement is such that the shallow portion 6, is immediately above the axle 2, while the deep portion 5 depends to the rear of the axle, and as so arranged affords a maximum capacity to the drawer.

Having thus fully described my said invention what I claim as new and desire to secure by Letters Patent is:—

In a vehicle of the character herein described, the combination of a floor, guide tracks on the underside of said floor and near the rear end of the same, and a drawer moving on said tracks and formed with a deep rear portion and a forward shallow portion, substantially as set forth.

Signed at Chicago, Illinois, this 19th day of December 1906.

CHARLES CRETORS.

Witnesses:
ROBERT BURNS,
HENRY MCE.